US012220968B2

(12) United States Patent
Hall et al.

(10) Patent No.: US 12,220,968 B2
(45) Date of Patent: Feb. 11, 2025

(54) THERMAL MANAGEMENT SYSTEM, POWERTRAIN, AND VEHICLE

(71) Applicant: Scania CV AB, Södertälje (SE)

(72) Inventors: Ola Hall, Stockholm (SE); Martin Mohlin, Stockholm (SE); Zoltan Kardos, Södertälje (SE); Rickard Eriksson, Rönninge (SE)

(73) Assignee: Scania CV AB, Södertälje (SE)

( * ) Notice: Subject to any disclaimer, the term of this patent is extended or adjusted under 35 U.S.C. 154(b) by 446 days.

(21) Appl. No.: 17/618,792

(22) PCT Filed: Jun. 10, 2020

(86) PCT No.: PCT/SE2020/050600
§ 371 (c)(1),
(2) Date: Dec. 13, 2021

(87) PCT Pub. No.: WO2021/006788
PCT Pub. Date: Jan. 14, 2021

(65) Prior Publication Data
US 2022/0234420 A1 Jul. 28, 2022

(30) Foreign Application Priority Data
Jul. 5, 2019 (SE) .................................... 1950848-0

(51) Int. Cl.
*B60H 1/00* (2006.01)
*B60H 1/14* (2006.01)
(Continued)

(52) U.S. Cl.
CPC ..... *B60H 1/00899* (2013.01); *B60H 1/00278* (2013.01); *B60H 1/00385* (2013.01);
(Continued)

(58) Field of Classification Search
CPC ............ B60H 1/00278; B60H 1/00385; B60H 1/143; B60H 1/32284; B60H 2001/00928;
(Continued)

(56) References Cited

U.S. PATENT DOCUMENTS 7,841,431 B2     11/2010   Zhou
2010/0012295 A1*  1/2010   Nemesh ............ H01M 10/6568
                                                       165/104.19
(Continued)

FOREIGN PATENT DOCUMENTS

CN   103213472 A   7/2013
CN   208530218 U   2/2019
(Continued)

OTHER PUBLICATIONS

Scania CV AB, European Patent Application No. 20836895.1, Extended European Search Report, Jul. 7, 2023.
(Continued)

Primary Examiner — Lionel Nouketcha
(74) Attorney, Agent, or Firm — Moore & Van Allen PLLC; W. Kevin Ransom

(57) ABSTRACT

A thermal management system for a vehicle is disclosed, wherein the vehicle comprises an occupant compartment and a propulsion system configured to provide motive power to the vehicle. The system comprises a propulsion coolant circuit configured to cool at least a portion of the propulsion system, a heating circuit configured to heat the occupant compartment, and a heat pump circuit comprising a first evaporator in the propulsion coolant circuit and a condenser in the heating circuit. The propulsion coolant circuit comprises a connecting conduit connecting the propulsion coolant circuit to the heating circuit at a position upstream of the condenser, and a first valve configured to control flow of coolant through the connecting conduit. The present disclo- (Continued)

sure further relates to a powertrain for a vehicle, as well as a vehicle.

18 Claims, 3 Drawing Sheets

(51) Int. Cl.
*B60H 1/32* (2006.01)
*B60K 1/00* (2006.01)
*B60K 11/02* (2006.01)
*F01P 3/20* (2006.01)
*F01P 7/16* (2006.01)

(52) U.S. Cl.
CPC ......... *B60H 1/143* (2013.01); *B60H 1/32284* (2019.05); *F01P 3/20* (2013.01); *F01P 7/165* (2013.01); *B60H 2001/00307* (2013.01); *B60H 2001/00928* (2013.01); *B60H 2001/00949* (2013.01); *B60K 1/00* (2013.01); *B60K 2001/003* (2013.01); *B60K 2001/005* (2013.01); *B60K 2001/006* (2013.01); *B60K 11/02* (2013.01); *F01P 2050/24* (2013.01); *F01P 2060/08* (2013.01); *F01P 2060/14* (2013.01); *Y02T 10/70* (2013.01)

(58) Field of Classification Search
CPC .......... F01P 3/20; F01P 2050/24; F01P 7/165; B60K 1/00; B60K 2001/003; B60K 2001/005; B60K 2001/006; Y02T 10/70
See application file for complete search history.

(56) References Cited

U.S. PATENT DOCUMENTS

| | | |
|---|---|---|
| 2010/0301124 A1 | 12/2010 | Williams et al. |
| 2012/0297809 A1* | 11/2012 | Carpenter ............... B60L 58/26 62/239 |
| 2013/0140001 A1 | 6/2013 | Mandl |
| 2015/0251518 A1 | 9/2015 | Nemesh |
| 2016/0272044 A1 | 9/2016 | Cheng |
| 2016/0297283 A1 | 10/2016 | Sakamoto et al. |
| 2017/0008407 A1 | 1/2017 | Porras et al. |
| 2017/0054188 A1* | 2/2017 | Blatchley ............ H01M 10/613 |
| 2018/0162193 A1 | 6/2018 | Horn et al. |
| 2018/0208061 A1 | 7/2018 | Ben Ahmed et al. |
| 2018/0312035 A1 | 11/2018 | Koberstein et al. |
| 2019/0047369 A1 | 2/2019 | Kim |

FOREIGN PATENT DOCUMENTS

| | | | |
|---|---|---|---|
| DE | 102011016613 | A1 | 11/2011 |
| EP | 2301777 | A1 | 3/2011 |
| EP | 2392486 | A2 | 12/2011 |
| EP | 3012133 | A2 | 4/2016 |
| JP | 2004075050 | A | 3/2004 |
| WO | 2018092464 | A1 | 5/2018 |

OTHER PUBLICATIONS

Scania CV AB, International Patent Application No. PCT/SE2020/050600, International Search Report, Jul. 7, 2020.
Scania CV AB, International Patent Application No. PCT/SE2020/050600, Written Opinion, Jul. 7, 2020.
Scania CV AB, Swedish Patent Application No. 1950848-0, Office Action, Jan. 30, 2020.
Scania CV AB, Swedish Patent Application No. 1950848-0, Office Action, Jul. 7, 2020.
Scania CV AB, Chinese Patent Application No. 202080042011.X, First Office Action, Oct. 28, 2023.
Scania CV AB, International Patent Application No. PCT/SE2020/050600, International Preliminary Report on Patentability, Jan. 11, 2022.
Scania CV AB, Brazilian Patent Application No. BR112021025046-8, Preliminary Office Action, Jul. 2, 2024.
Scania CV AB, European Patent Application No. 20836895.1, Communication pursuant to Article 94(3) EPC, Aug. 23, 2024.

* cited by examiner

THERMAL MANAGEMENT SYSTEM, POWERTRAIN, AND VEHICLE

CROSS-REFERENCE TO RELATED APPLICATIONS

This application is a National Stage Patent Application (filed under 35 § U.S.C. 371) of PCT/SE2020/050600, filed Jun. 10, 2020 of the same title, which, in turn claims priority to Swedish Patent Application No. 1950848-0 filed Jul. 5, 2019 of the same title; the contents of each of which are hereby incorporated by reference.

FIELD OF THE INVENTION

The present disclosure relates to a thermal management system for a vehicle. The present disclosure further relates to a powertrain for a vehicle, as well as a vehicle comprising a powertrain.

BACKGROUND OF THE INVENTION

Vehicles with an occupant compartment usually comprise a heating arrangement for heating the occupant compartment utilizing waste heat of a propulsion system of the vehicle. Due to environmental concerns, as well as economic concerns of customers, propulsion systems of modern vehicles have become more energy efficient meaning that less waste heat is available for heating the occupant compartment.

Some propulsion systems comprise an internal combustion engine, for example a compression ignition engine, such as a diesel engine, or an Otto engine, which generates excess heat during operation. However, many modern vehicles are equipped with a start-stop system arranged to automatically shut down and restart the internal combustion engine to reduce the amount of time the engine spends idling, thereby reducing fuel consumption and emissions. Moreover, these types of engines have become increasingly energy efficient meaning that the waste heat generated by the internal combustion engine may be insufficient for heating the occupant compartment to a desired level with a traditional heating arrangement.

Some vehicles comprise an electric propulsion system comprising an electric machine, power electronics, a battery, and the like. These components generate heat during operation which can be used to heat the occupant compartment. However, the amount of heat generated is significantly lower than what is generated by an internal combustion engine. Moreover, during periods of stand still, the maximum temperature of some components may be less than an optimum temperature for heating the occupant compartment.

Electric propulsion systems can be divided into the categories fully electric propulsion systems and hybrid electric propulsion systems. A fully electric propulsion system is arranged to purely operate on electricity and comprise no internal combustion engine. A hybrid electric propulsion system uses two or more distinct types of power, such as an internal combustion engine and an electric machine. Generally, an internal combustion engine has poor energy efficiency at lower power output levels and better energy efficiency at higher power output levels. An electric propulsion system usually has great energy efficiency at low power output levels and at high power output levels, but the storage of electric energy in the vehicle is usually insufficient for allowing longer time periods of operation at higher power output levels.

Therefore, some hybrid electric propulsion systems are configured to switch between electric propulsion and combustion engine propulsion in dependence of the load such that the electric propulsion system is operated in low load situations and the combustion engine is started and operated in higher load situations. Some hybrid electric propulsion systems are configured to allow simultaneous operation of the electric propulsion system and the combustion engine. The electric energy can be stored in batteries for use for propulsion of the vehicle. In this manner, the total energy efficiency of the vehicle can be improved, especially when driving in areas with many starts and stops, such as when driving in urban areas.

A further advantage of hybrid electric propulsion systems is that they can allow pure electric propulsion system in certain areas, such as in city centres, and other areas sensitive to emission of exhaust gases, and/or emission of noise. As understood from the above, in many cases, the waste heat generated by a hybrid electric propulsion system can be insufficient for heating the occupant compartment of the vehicle. Therefore, some hybrid electric propulsion systems are arranged to start the internal combustion engine when the heating demand of the occupant compartment is high and the available heat in the propulsion system is low to thereby increase the available heat in the propulsion system. Such a start-up of the internal combustion engine increases the consumption of fuel and increases emissions from the propulsion system.

Using a heat pump circuit between the propulsion coolant circuit and a heating circuit for the occupant compartment is an efficient and effective way of increasing the heat transfer from the propulsion system to the occupant compartment. However, as is the case with several other types of systems, a heat pump circuit has a narrow operational range in which it operates most efficiently and seasonal changes, temperature variations, and variations in heating demand of the occupant compartment put limitations on the efficiency of such a system.

Moreover, seasonal changes, temperature variations, and variations in heating demand of the occupant compartment put different requirements on such a system, which can be conflicting requirements. Furthermore, a propulsion system of a vehicle may comprise components sensitive to low or high temperatures.

Furthermore, generally, on today's consumer market, it is an advantage if products, such as vehicle systems and their associated components, have conditions and/or characteristics suitable for being manufactured and assembled in a cost-efficient manner.

SUMMARY OF THE INVENTION

It is an object of the present invention to overcome, or at least alleviate, at least some of the above-mentioned problems and drawbacks.

According to a first aspect of the invention, the object is achieved by a thermal management system for a vehicle, wherein the vehicle comprises an occupant compartment and a propulsion system configured to provide motive power to the vehicle. The thermal management system a propulsion coolant circuit configured to cool at least a portion of the propulsion system, a heating circuit configured to heat the occupant compartment, and a heat pump circuit comprising a first evaporator in the propulsion coolant circuit and a condenser in the heating circuit. The propulsion coolant circuit comprises a connecting conduit connecting the propulsion coolant circuit to the heating circuit at a position upstream of the condenser. The propulsion coolant circuit further comprises a first return conduit configured to return coolant to the propulsion coolant circuit from the heating circuit at a position downstream of the condenser. The thermal management system further comprises a first valve configured to control flow of coolant through the connecting conduit.

Since the propulsion coolant circuit comprises the connecting conduit and the first valve configured to control flow of coolant through the connecting conduit, a more flexible and more controllable thermal management system is provided allowing the heating circuit to operate at a higher temperature level than the temperature level of the propulsion coolant circuit.

Accordingly, by controlling the first valve to hinder flow of coolant through the connecting conduit, the coolant of the propulsion coolant circuit bypasses the condenser and the heating circuit becomes isolated from the propulsion coolant circuit allowing the heating circuit to operate at a higher temperature level than the temperature level of the propulsion coolant circuit. Thereby, the heat pump circuit can transfer heat from the propulsion coolant circuit to the heating circuit in a more efficient manner for example during wintertime when the ambient temperature is low, and the heating demand of the occupant compartment is high.

Moreover, a thermal management system is provided in which the condenser can be cooled by the propulsion coolant circuit by controlling the first valve to allow flow of coolant through the connecting conduit, for example during summertime when the ambient temperature is higher, and the heating demand of the occupant compartment is lower. Furthermore, a thermal management system is provided in which the condenser can be used for heating components of the propulsion system when needed by controlling the first valve to allow flow of coolant through the connecting conduit.

Thus, due to these features, heat can be transferred to and from the propulsion system in a more efficient manner, meaning that conditions are provided for a more efficient utilization of energy in a vehicle comprising the thermal management system. Moreover, a thermal management system is provided capable of improving occupant compartment heating performance of a vehicle comprising the thermal management system.

Accordingly, a thermal management system is provided overcoming, or at least alleviating, at least some of the above-mentioned problems and drawbacks. As a result, the above-mentioned object is achieved.

Optionally, the propulsion coolant circuit comprises a bypass line bypassing the connecting conduit, and wherein the first valve is controllable between a first state in which the first valve directs coolant through the connecting conduit and a second state in which the first valve directs coolant through the bypass line. Thereby, a simple and reliable control of flow of coolant is provided.

Optionally, the heating circuit comprises a heater arranged downstream of the condenser and downstream of the first return conduit. Thereby, a thermal management system is provided allowing the heater to heat the heating circuit without transferring the heat to the propulsion coolant circuit via the condenser. The heater may for example comprise an electrical heater or a fuel fired heater. As an alternative, or in addition, in embodiments where the vehicle comprises a hybrid electric propulsion system and the propulsion coolant circuit is arranged to cool electrical components of the propulsion system, the heater may comprise a heat exchanger arranged to transfer heat from a combustion engine coolant circuit to the heating circuit.

Optionally, the propulsion system is an electric propulsion system comprising power electronics and an electric machine, and wherein the propulsion coolant circuit is configured to cool at least one of the power electronics and the electric machine. Thereby, a flexible and more controllable thermal management system is provided allowing the heating circuit to operate at a higher temperature level than the temperature level of components of the electric propulsion system. Furthermore, a thermal management system is provided in which the condenser can be used for heating components of the electric propulsion system when needed by controlling the first valve to allow flow of coolant through the connecting conduit.

Optionally, the heat pump circuit comprises a second evaporator configured to cool the occupant compartment and a second valve controllable between a first state in which the second valve causes working media in the heat pump circuit to flow through the first evaporator, and a second state in which the second valve causes working media in the heat pump circuit to flow through the second evaporator. Thereby, a thermal management system is provided in which the heat pump circuit can be used to cool the occupant compartment. Thus, by controlling the first valve to allow flow of coolant through the connecting conduit and controlling the second valve to the second state, the heat collected by the second evaporator can be transferred to the condenser and transferred from the condenser to the surroundings via the propulsion coolant circuit.

Optionally, the system comprises a control arrangement configured to, in an occupant compartment cooling mode, control the first valve to allow flow of coolant through the connecting conduit and control the second valve to the second state. Thereby, a thermal management system is provided in which the heat pump circuit can be used to cool the occupant compartment in an efficient manner where the heat collected by the second evaporator can be transferred to the condenser and transferred from the condenser to the surroundings via the propulsion coolant circuit.

Optionally, the control arrangement is configured to, in an occupant compartment heating mode, control the first valve to hinder flow of coolant through the connecting conduit and control the second valve to the first state. Thereby, a thermal management system is provided in which the heat pump circuit can be used to heat the occupant compartment in an efficient manner where the heat collected by the first evaporator can be transferred to the heating circuit in an efficient manner via the condenser.

Optionally, the propulsion coolant circuit comprises a first radiator and a first coolant pump, and wherein the system comprises a control arrangement configured to, in a first heat pump operation mode, control the first valve to hinder flow of coolant through the connecting conduit and activate the first coolant pump so as to transfer heat collected from the surroundings by the first radiator to the first evaporator. Thereby, a thermal management system is provided in which heat from the surroundings can be utilized for heating the occupant compartment. As a result thereof, the occupant compartment can be heated in an energy efficient manner also in cases where substantially no excess heat is available in the propulsion system. As a further result thereof, the need for starting the propulsion system, or components thereof, for increasing the available heat in the propulsion system is circumvented. Accordingly, the thermal management system provides conditions for a more efficient utilization of energy in a propulsion system of a vehicle.

Optionally, the control arrangement is configured to operate the system in the first heat pump operation mode when the temperature level in the propulsion system is below a threshold level. Thereby, conditions are provided for a more efficient utilization of energy in a propulsion system of a vehicle. The threshold level may be set to a level in which it is determined that the heat available in the propulsion system is insufficient for heating the occupant compartment, and/or to a minimum temperature level required by components of the propulsion system.

Optionally, the propulsion coolant circuit comprises a coolant branch and a third valve configured to regulate the flow of coolant through the coolant branch, and wherein the first evaporator is arranged in the coolant branch. Thereby, a more flexible and more controllable thermal management system is provided in which flow of coolant through the first evaporator, and thus also the heat transfer to the first evaporator, can be regulated simply by controlling the third valve.

Optionally, the propulsion system is an electric propulsion system comprising a battery, and wherein the first evaporator is further configured to cool the battery. Thereby, a thermal management system is provided capable of utilizing heat generated by the battery for heating the occupant compartment. Moreover, conditions are provided for cooling the battery to a lower temperature level than other portions of the electric propulsion system such as the power electronics and/or the electric machine.

Optionally, the system comprises a battery coolant circuit configured to cool the battery, and wherein the battery coolant circuit comprises an inlet in the coolant branch downstream of the first evaporator and an outlet in the coolant branch upstream of the first evaporator. Thereby, a thermal management system is provided in which the battery can be cooled to a lower temperature level than other portions of the electric propulsion system such as the power electronics and/or the electric machine.

Optionally, the battery coolant circuit comprises a battery coolant branch, a battery radiator in the battery coolant branch, and a fourth valve configured to regulate the flow of coolant through the battery coolant branch. Thereby, a thermal management system is provided in which the battery can be cooled by the first evaporator as well as by the battery radiator. In this manner, an improved flexibility is provided, and the maximum cooling capacity of the battery is increased. Moreover, conditions are provided for a cooling of the battery in a manner being independent from the cooling of other components of the electric propulsion system, such as the power electronics and/or the electric machine.

Optionally, the battery coolant circuit comprises a battery coolant pump, and wherein the system comprises a control arrangement configured to, in a second heat pump operation mode, control the fourth valve to regulate flow of coolant through the battery coolant branch and activate the battery coolant pump so as to transfer heat collected from the surroundings by the battery radiator to the first evaporator. Thereby, a thermal management system is provided in which heat from the surroundings can be utilized for heating the occupant compartment. As a result thereof, the occupant compartment can be heated in an energy efficient manner also in cases where substantially no excess heat is available in the propulsion system. As a further result thereof, the need for starting the propulsion system, or components thereof, for increasing the available heat in the propulsion system is circumvented. Accordingly, the thermal management system provides conditions for a more efficient utilization of energy in a propulsion system of a vehicle.

Optionally, the control arrangement is configured to operate the system in the second heat pump operation mode when the temperature level in the propulsion system is below a threshold level. Thereby, conditions are provided for a more efficient utilization of energy in a propulsion system of a vehicle.

Optionally, the heating circuit comprises a heat exchanger configured to heat the occupant compartment, and wherein the first return conduit is configured to return coolant to the propulsion coolant circuit from the heating circuit at a position upstream of the heat exchanger. Thereby, coolant can be returned to the propulsion coolant circuit without passing the heat exchanger of the heating circuit.

Optionally, the propulsion coolant circuit comprises a second return conduit configured to return coolant to the propulsion coolant circuit from the heating circuit at a position downstream of the heat exchanger. Thereby, conditions are provided for selecting if the coolant ducted from the propulsion coolant circuit shall pass the heat exchanger or not simply by controlling the flow through the first and second return conduits.

Optionally, the system comprises a flow control arrangement controllable between a first state in which the flow control arrangement directs coolant through the first return conduit and a second state in which the flow control arrangement directs coolant through the second return conduit. Thereby, a system is provided capable of selecting if the coolant ducted from the propulsion coolant circuit shall pass the heat exchanger or not simply by controlling the flow control arrangement between the first and second states.

Optionally, the heating circuit comprises a heat exchanger and a fan configured to generate an airflow through the heat exchanger towards the occupant compartment, and wherein the system comprises a valve arrangement controllable to a state in which the valve arrangement directs at least part of the airflow to the surroundings. In this manner, a thermal management system is provided with improved maximum cooling capacity of components of the propulsion system. This because heat collected from the propulsion coolant circuit can be transferred from the condenser to the surroundings via the heating circuit. That is, due to the valve arrangement, more heat can be dissipated from the heating circuit, and thus also from the propulsion coolant circuit, than what is needed given a current heating demand of the occupant compartment.

Accordingly, a thermal management system is provided improving the maximum cooling capacity of components of the propulsion system in a manner circumventing the need for using larger radiator, larger pumps, hoses, and the like, which would add cost, weight, and complexity to the thermal management system. Thus, the maximum cooling capacity of components of the propulsion system is improved in a cost and energy efficient manner.

Optionally, the heating circuit comprises a heating circuit pump configured to pump coolant through the heating circuit, and wherein the heating circuit pump is arranged between the connecting conduit and the first return conduit. In this manner, the heating circuit pump will pump coolant from the connecting conduit and trough the condenser when the first valve is controlled to allow flow of coolant through the connecting conduit.

According to a second aspect of the invention, the object is achieved by a powertrain for a vehicle, wherein the powertrain comprises a propulsion system configured to provide motive power to the vehicle, and a thermal management system according to some embodiments of the present disclosure.

Since the powertrain comprises a thermal management system according to some embodiments of the present disclosure, a more flexible and thermally controllable powertrain is provided allowing the heating circuit of the thermal management system to operate at a higher temperature level than the temperature level of the propulsion coolant circuit. In this manner, the heat pump circuit of the thermal management system can transfer heat from the propulsion coolant circuit to the heating circuit in a more efficient manner for example during wintertime when the ambient temperature is low, and the heating demand of the occupant compartment is high.

Moreover, a powertrain is provided in which the condenser of the thermal management can be cooled by the propulsion coolant circuit by controlling the first valve to allow flow of coolant through the connecting conduit, for example during summertime when the ambient temperature is higher, and the heating demand of the occupant compartment is lower. Furthermore, a powertrain is provided in which the condenser of the thermal management can be used for heating components of the propulsion system when needed by controlling the first valve to allow flow of coolant through the connecting conduit.

Thus, due to these features, heat can be transferred to and from the propulsion system of the powertrain in a more efficient manner, meaning that conditions are provided for a more efficient utilization of energy in a vehicle comprising the powertrain. Moreover, a powertrain is provided capable of improving the heating performance of the occupant compartment of the vehicle.

Accordingly, a powertrain is provided overcoming, or at least alleviating, at least some of the above-mentioned problems and drawbacks. As a result, the above-mentioned object is achieved.

According to a third aspect of the invention, the object is achieved by a vehicle comprising an occupant compartment and a powertrain according to some embodiments of the present disclosure.

Since the vehicle comprises a powertrain according to some embodiments of the present disclosure, a vehicle is provided comprising a more flexible and more controllable thermal management system in which the heating circuit is allowed to operate at a higher temperature level than the temperature level of the propulsion coolant circuit. In this manner, the heat pump circuit of the thermal management system can transfer heat from the propulsion coolant circuit to the heating circuit in a more efficient manner for example during wintertime when the ambient temperature is low, and the heating demand of the occupant compartment of the vehicle is high.

Moreover, a vehicle is provided in which the condenser of the thermal management can be cooled by the propulsion coolant circuit by controlling the first valve to allow flow of coolant through the connecting conduit, for example during summertime when the ambient temperature is higher, and the heating demand of the occupant compartment is lower. Furthermore, a vehicle is provided in which the condenser of the thermal management can be used for heating components of the propulsion system when needed by controlling the first valve to allow flow of coolant through the connecting conduit.

Thus, due to these features, heat can be transferred to and from the propulsion system of the vehicle in a more efficient manner, meaning that conditions are provided for a more efficient utilization of energy in the vehicle. Moreover, a vehicle is provided having conditions for an improved heating performance of the occupant compartment.

Accordingly, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION OF THE INVENTION

Aspects of the present invention will now be described more fully. Like numbers refer to like elements throughout. Well-known functions or constructions will not necessarily be described in detail for brevity and/or clarity.

Figure 1:
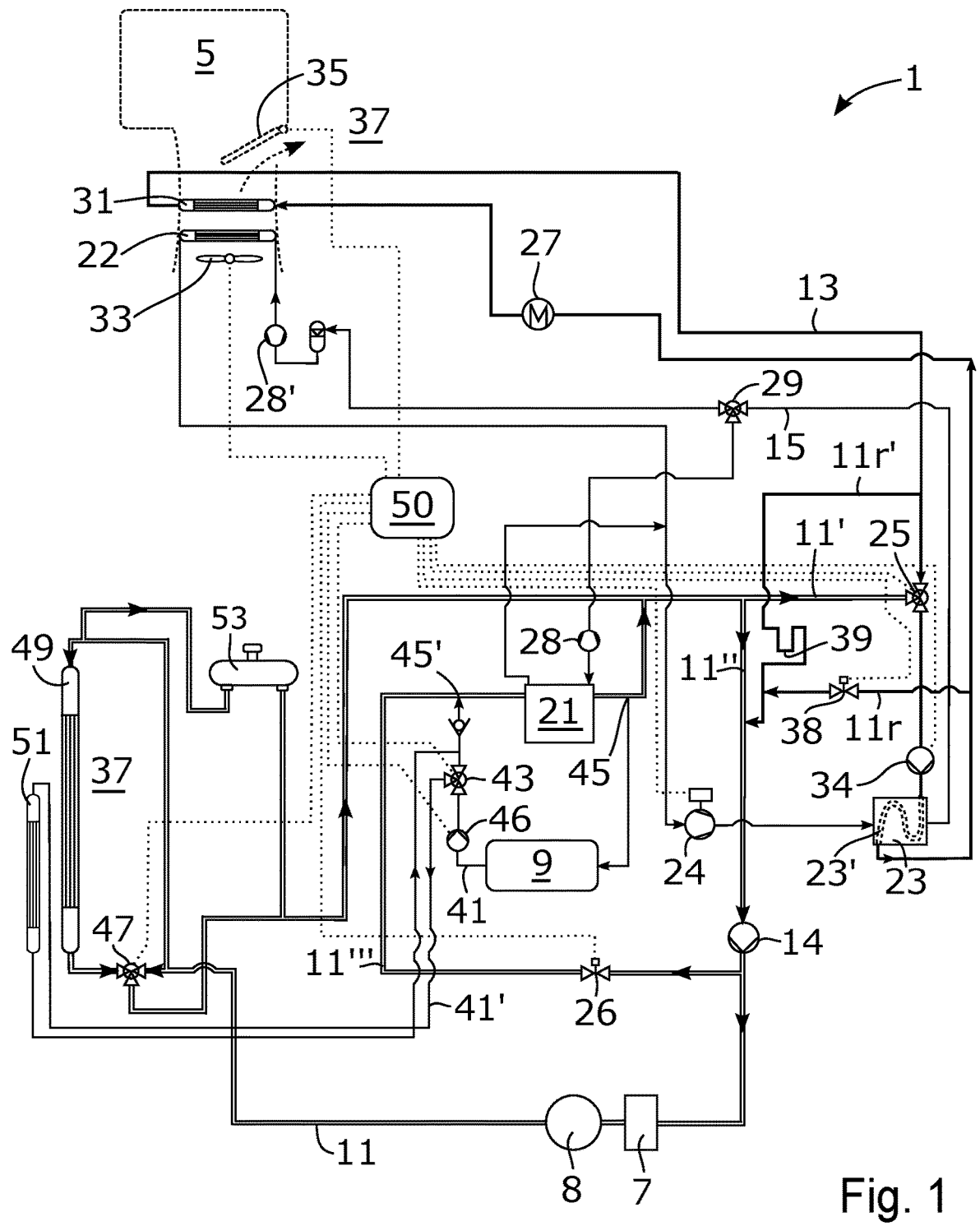
FIG. 1 schematically illustrates a thermal management system, according to some embodiments, FIG. 2 schematically illustrates a thermal management system, according to some further embodiments, FIG. 3 schematically illustrates a thermal management system, according to some further embodiments.

FIG. 1 schematically illustrates a thermal management system 1 according to some embodiments. The thermal management system 1 is configured to control transfer of heat in a vehicle, wherein the vehicle comprises an occupant compartment 5 and a propulsion system 7, 8, 9 configured to provide motive power to the vehicle. The occupant compartment 5 is configured to accommodate one or more occupants. The thermal management system 1 is in some places herein referred to as "the system 1" for the reason of brevity and clarity. According to the illustrated embodiments, propulsion system 7, 8, 9 is an electric propulsion system 7, 8, 9 comprising power electronics 7, an electric machine 8, and a battery 9. The electric machine 8 is configured to provide motive power to the vehicle using electric energy stored in the battery 9 by an amount controlled by the power electronics 7.

According to further embodiments of the present disclosure, the propulsion system 7, 8, 9, as referred to herein, may comprise a combustion engine such as for example a compression ignition engine, such as a diesel engine, or an Otto engine with a spark-ignition device, wherein the Otto engine may be configured to run on gas, petrol, alcohol, similar fuels, or combinations thereof. According to still further embodiments of the present disclosure, the propulsion system 7, 8, 9, as referred to herein, may comprise a combustion engine in addition to power electronics 7, an electric machine 8 and a battery 9. According to such embodiments, the propulsion system 7, 8, 9 may be referred to as a hybrid electric propulsion system 7, 8, 9. The combustion engine of such a hybrid electric propulsion system 7, 8, 9 may for example comprise a compression ignition engine, such as a diesel engine, or an Otto engine with a spark-ignition device, wherein the Otto engine may be configured to run on gas, petrol, alcohol, similar fuels, or combinations thereof.

The thermal management system 1 comprises a propulsion coolant circuit 11 configured to cool at least a portion 7, 8, 9 of the propulsion system 7, 8, 9. The propulsion coolant circuit 11 comprises a first radiator 49, coolant channels in the components 7, 8, 9 to be cooled, and a first coolant pump 14 arranged to pump coolant through the propulsion coolant circuit 11. The propulsion coolant circuit 11 further comprises a radiator valve 47 arranged to direct flow to the first radiator 49 and/or to a bypass line bypassing the first radiator 49. The propulsion coolant circuit 11 further comprises an expansion tank 53 arranged upstream of the first coolant pump 14. The thermal management system 1 further comprises a heating circuit 13 configured to heat the occupant compartment 5. According to the illustrated embodiments, the heating circuit 13 comprises a heat exchanger 31 and a heating circuit pump 34 configured to pump coolant through the heating circuit 13. Moreover, according to the illustrated embodiments, the system 1 comprises a fan 33 configured to generate an airflow through the heat exchanger 31 towards the occupant compartment 5. The heat exchanger 31 is thus configured to heat the occupant compartment 5.

The system 1 further comprises a heat pump circuit 15 comprising a first evaporator 21 in the propulsion coolant circuit 11 and a condenser 23 in the heating circuit 13. Furthermore, the heat pump circuit 15 comprises a first expansion valve 28 arranged upstream of the first evaporator 21 and a compressor 24 arranged to pump working media, such as a refrigerant, through the heat pump circuit 15.

The propulsion coolant circuit 11 comprises a connecting conduit 11' connecting the propulsion coolant circuit 11 to the heating circuit 13 at a position upstream of the condenser 23. An outlet of the connecting conduit 11' is thus positioned upstream of the condenser 23 such that coolant flowing through the connecting conduit 11' flows into the heating circuit 13 at a position upstream of the condenser 23. Moreover, the propulsion coolant circuit 11 comprises a first return conduit 11r configured to return coolant to the propulsion coolant circuit 11 from the heating circuit 13 at a position downstream of the condenser 23. An inlet of the first return conduit 11r is thus positioned downstream of the condenser 23 such that coolant is flowing from the heating circuit 13 at a position downstream of the condenser 23 into the first return conduit 11r.

Moreover, the system 1 comprises a first valve 25. The first valve 25 is configured to control flow of coolant through the connecting conduit 11'. That is, the first valve 25 is controllable between a first state, in which the first valve 25 allows flow of coolant through the connecting conduit 11', and a second state, in which the first valve 25 hinders flow of coolant through the connecting conduit 11'. In more detail, according to the embodiments illustrated in FIG. 1, the first valve 25 comprises one outlet and a first and a second inlet. The outlet is connected to the heating circuit pump 34 of the heating circuit 13, the first inlet is connected to the connecting conduit 11' and the second inlet is connected to heat exchanger 31 of the heating circuit 13. In the first state, the first valve opens the first inlet, and in the second state, the first valve 25 closes the first inlet. As indicated in FIG. 1, the propulsion coolant circuit 11 comprises a bypass line 11" bypassing the connecting conduit 11'. The bypass line 11" forms a continuation of the propulsion coolant circuit 11 and is connected to the first coolant pump 14 of the propulsion coolant circuit 11. The bypass line 11" may also be referred to as a portion 11" of the propulsion coolant circuit 11 upstream of the first coolant pump 14 of the propulsion coolant circuit 11. The coolant is directed to the bypass line 11" instead of flowing through the connecting conduit 11' when the first valve 25 is in the second state.

In this manner, as is further explained herein, the heat pump circuit 15 can be fluidly isolated from the propulsion coolant circuit 11 simply by controlling the first valve 25 to the second state. Thereby, the heat pump circuit 15 can be operated at a higher temperature level than the propulsion coolant circuit 11, which provides several advantages, as is further explained herein.

According to the embodiments illustrated in FIG. 1, the heating circuit pump 34 is arranged between the connecting conduit 11' and the first return conduit 11r. Thus, according to the embodiments illustrated in FIG. 1, the heating circuit pump 34 will pump coolant from the connecting conduit 11', through the condenser 23 when the first valve 25 is in the first state. In this manner, a stable pressure distribution is obtained in the respective circuit 11, 13. The heating circuit 13 comprises a heater 27 arranged downstream of the condenser 23 and downstream of the first return conduit 11r. The heater 27 may for example comprise an electrical heater or a fuel fired heater. As an alternative, or in addition, in embodiments where the propulsion system 7, 8, 9 is a hybrid electric propulsion system and the propulsion coolant circuit 11 is arranged to cool electrical components 7, 8, 9 of the propulsion system 7, 8, 9, the heater 27 may comprise a heat exchanger arranged to transfer heat from a combustion engine coolant circuit to the heating circuit 13.

As understood from the above, coolant of the propulsion coolant circuit 11 and coolant of the heating circuit 13 will be at least partially mixed in coolant channels 23' of the condenser 23 when the first valve 25 is in the first state.

According to the illustrated embodiments, the first return conduit 11r is configured to return coolant to the propulsion coolant circuit 11 from the heating circuit 13 at a position upstream of the heat exchanger 31. Moreover, according to the embodiments illustrated in FIG. 1, the propulsion coolant circuit 11 comprises a second return conduit 11r. The second return conduit 11r is configured to return coolant to the propulsion coolant circuit 11 from the heating circuit 13 at a position downstream of the heat exchanger 31. An inlet of the second return conduit 11r is thus positioned downstream of the heat exchanger 31.

Furthermore, according to the embodiments illustrated in FIG. 1, the system 1 comprises a flow control arrangement 38, 39. According to the illustrated embodiments, the flow control arrangement 38, 39 comprises a valve 38 in the first return conduit 11r and a flow restrictor 39 in the second return conduit 11r. According to further embodiments, the second return conduit 11r may comprise a valve and the first return conduit 11r may comprise a flow restrictor. According to the illustrated embodiments, the flow restrictor 39 comprises an anti-mixing loop. The flow control arrangement 38, 39 is controllable between a first state in which the flow control arrangement 38, 39 directs coolant through the first return conduit 11r and a second state in which the flow control arrangement 38, 39 directs coolant through the second return conduit 11r.

In the first state, the valve 38 in the first return conduit 11r is opened to allow flow of coolant through the first return conduit 11r. When the flow control arrangement 38, 39 is in the first state, i.e. when the valve 38 in the first return conduit 11r is opened, the flow restrictor 39 hinders flow of coolant through the second return conduit 11r'. In the second state, the valve 38 in the first return conduit 11r is closed to hinder flow of coolant through the first return conduit 11r. When the flow control arrangement 38, 39 is in the second state, i.e.

when the valve 38 in the first return conduit 11r is closed, the flow restrictor 39 allows flow of coolant through the second return conduit 11r'. In this manner, the coolant can be returned to the propulsion coolant circuit 11 in a manner bypassing the heat exchanger 31 of the heating circuit 13 or in a manner where the returned coolant has flown through the heat exchanger 31 of the heating circuit 13, simply by controlling the flow control arrangement 38, 39 between the first and second states. The flow control arrangement 38, 39 can thus be utilized to increase the flow rate of coolant through the condenser 23 when there is a low heating need of the occupant compartment 5, such as during summertime. That is, by controlling the flow control arrangement 38, 39 to the first state, i.e. by opening the valve 38, a lower pressure drop is provided which can increase the flow rate of coolant through the condenser 23.

According to the illustrated embodiments, the heat pump circuit 15 comprises a second evaporator 22 configured to cool the occupant compartment 5. Moreover, the heat pump circuit 15 comprises a second valve 29 controllable between a first state in which the second valve 29 causes working media in the heat pump circuit 15 to flow through the first evaporator 21, and a second state in which the second valve 29 causes working media in the heat pump circuit 15 to flow through the second evaporator 22. According to the illustrated embodiments, the second valve 29 is a three-way valve comprising an inlet connected to the condenser 23, a first outlet connected to the first evaporator 21 and a second outlet connected to the second evaporator 22. In the first state, the second valve 29 opens a connection to the first evaporator 21 and closes the connection to the second evaporator 22. In the second state, the second valve 29 opens a connection to the second evaporator 22 and closes the connection to the first evaporator 21. According to some embodiments, the second valve 29 may be controllable to a third state in which the second valve 29 opens the connection to the first evaporator 21 as well as opens the connection to the second evaporator 22, as is further explained herein.

The heat pump circuit 15 comprises a second expansion valve 28' arranged upstream of the second evaporator 22. In this manner, as is further explained herein, the heat pump circuit 15 can be utilized to cool the occupant compartment 5, i.e. used as an air conditioning unit for cooling the occupant compartment 5. According to the illustrated embodiments, the system 1 comprises a fan 33 configured to generate an airflow through the second evaporator 22 towards the occupant compartment 5.

According to the illustrated embodiments, the propulsion coolant circuit 11 comprises a coolant branch 11''' and a third valve 26 configured to regulate the flow of coolant through the coolant branch 11''', wherein the first evaporator 21 is arranged in the coolant branch 11'''. Thereby, a more flexible and more controllable thermal management system 1 is provided in which flow of coolant through the first evaporator 21, and thus also the heat transfer to the first evaporator 21, can be regulated simply by controlling the third valve 26.

Moreover, according to the illustrated embodiments, the first evaporator 21 is further configured to cool the battery 9. Thereby, a thermal management system 1 is provided capable of utilizing heat generated by the battery 9 for heating the occupant compartment 5. Moreover, conditions are provided for cooling the battery 9 to a lower temperature level than other portions of the electric propulsion system 7, 8, 9 such as the power electronics 7 and/or the electric machine 8. As an alternative, or in addition, the first evaporator 21 may be further configured to cool one or more types of components, such as one or more capacitors, or the like.

The system 1 comprises a battery coolant circuit 41, 41' configured to cool the battery 9. The battery coolant circuit 41, 41' comprises an inlet 45 in the coolant branch 11''' downstream of the first evaporator 21 and an outlet 45' in the coolant branch 11''' upstream of the first evaporator 21. The battery coolant circuit 41, 41' comprises a battery coolant branch 41', a battery coolant pump 46 arranged to pump coolant through the battery coolant circuit 41, 41', a battery radiator 51 in the battery coolant branch 41', and a fourth valve 43 configured to regulate the flow of coolant through the battery coolant branch 41'.

Due to these features, a thermal management system 1 is provided in which the battery 9 can be cooled by the first evaporator 21 as well as by the battery radiator 51. In this manner, an improved controllability is provided and the maximum cooling capacity of the battery 9 is increased. Moreover, conditions are provided for a cooling of the battery 9 in a manner being independent from the cooling of other components of the electric propulsion system 7, 8, 9 such as the power electronics 7 and/or the electric machine 8.

According to the illustrated embodiments, the system 1 comprises a valve arrangement 35 controllable to a state in which the valve arrangement 35 directs at least part of the airflow generated by the fan 33 to the surroundings 37. That is, in this state, the valve arrangement 35 directs at least part of the airflow generated by the fan 33 to the surroundings 37 instead of the occupant compartment 37. In this manner, a thermal management system 1 is provided with improved maximum cooling capacity of components 7, 8, 9 of the propulsion system 7, 8, 9. This because heat collected from the propulsion coolant circuit 11 can be transferred from the condenser 23 to the surroundings 37 via the heating circuit 13. That is, due to the valve arrangement 35, more heat can be dissipated from the heating circuit 13, and thus also from the propulsion coolant circuit 11, than what is needed given a current heating demand of the occupant compartment 5.

According to the illustrated embodiments, the thermal management system 1 comprises a control arrangement 50 connected to components 14, 24, 25, 26, 29, 33, 34, 35, 38, 43, 46, 47 of the thermal management system 1 and being configured to control the components 14, 24, 25, 26, 29, 33, 34, 35, 38, 43, 46, 47 of the thermal management system 1.

The control arrangement 50 is configured to, in an occupant compartment heating mode, control the first valve 25 to the second state and control the second valve 29 to the first state. Moreover, in the occupant compartment heating mode, the control arrangement 50 may control the third valve 26 to direct at least part of the flow to the coolant branch 11''', and activate the first coolant pump 14, the compressor 24, the heating circuit pump 34, and/or the fan 33. In this manner, heat generated by the power electronics 7 and/or the electric machine 8 can be transferred to the occupant compartment 5 via the heating circuit 13 in an efficient manner and in a manner allowing the heating circuit 13 to have a higher temperature level than the propulsion coolant circuit 11. In the occupant compartment heating mode, the control arrangement 50 may control the radiator valve 47 to bypass the first radiator 49 or to direct coolant to the first radiator 49 depending on a cooling demand of the power electronics 7 and/or the electric machine 8.

Furthermore, in a second occupant compartment heating mode, when excess heat is available in the battery 9, the control arrangement 50 may activate the battery coolant pump 46. In this manner, heat from the battery 9 can be transferred to the first evaporator 21. Moreover, in the second occupant compartment heating mode, the control arrangement 50 may control the first valve 25 to the second state, control the second valve 29 to the first state, and activate the first coolant pump 14, the compressor 24, the heating circuit pump 34, and/or the fan 33. In the second occupant compartment heating mode, the control arrangement 50 may control the third valve 26 to a closed state, in which no coolant is directed to the coolant branch 11''', or a partially open state in which some coolant is directed to the coolant branch 11''', based on available heat generated by the power electronics 7 and/or the electric machine 8.

The control arrangement 50 is configured to, in an occupant compartment cooling mode, control the first valve 25 to the first state and control the second valve 29 to the second state. Moreover, in the occupant compartment cooling mode, the control arrangement 50 may activate the first coolant pump 14, the compressor 24, and/or the fan 33. In this manner, the second evaporator 22 can cool the occupant compartment 5 in an efficient manner and the heat collected by the second evaporator 22 can be dissipated to the surroundings 37 via the first radiator 49. In the occupant compartment cooling mode, the control arrangement 50 may control the radiator valve 47 to direct coolant to the first radiator 49. As an alternative, if there is a heating demand of one or more of the components 7, 8, 9 of the propulsion system 7, 8, 9, the control arrangement 50 may control the radiator valve 47 to bypass the first radiator 49 so as to provide heating of one or more of the components 7, 8, 9 of the propulsion system 7, 8, 9 using heat collected by the second evaporator 22.

The control arrangement 50 may be configured to, in a second occupant compartment cooling mode, control the second valve 29 to the third state. In this manner, the second valve 29 opens a connection from the condenser 23 to the first evaporator 21 as well as a connection from the condenser 23 to the second evaporator 22. As a result thereof, the first evaporator 21 can be utilized to cool the battery 9 and the second evaporator 22 can be utilized to cool the occupant compartment 5. In the third occupant compartment cooling mode, the control arrangement 50 may activate the battery coolant pump 46, control the first valve 25 to the first state, and activate the first coolant pump 14, the compressor 24, and/or the fan 33. In the second occupant compartment cooling mode, the control arrangement 50 may control the third valve 26 to a closed state, in which no coolant is directed to the coolant branch 11''', or a partially open state in which some coolant is directed to the coolant branch 11'''.

According to some embodiments, the control arrangement 50 is configured to, in a first heat pump operation mode, control the first valve 25 to the second state, control the control the radiator valve 47 to direct coolant to the first radiator 49 and activate the first coolant pump 14 so as to transfer heat collected from the surroundings 37 by the first radiator 49 to the first evaporator 21. Moreover, in the first heat pump operation mode, the control arrangement 50 may be configured to control the second valve 29 to the first state, activate the compressor 24, the heating circuit pump 34, and/or the fan 33. Furthermore, in the first heat pump operation mode, the control arrangement 50 may control the third valve 26 to direct at least part of the flow to the coolant branch 11'''.

In this manner, a thermal management system 1 is provided in which heat from the surroundings 37, collected by the first radiator 49, can be utilized for heating the occupant compartment 5. As a result thereof, the occupant compartment 5 can be heated in an energy efficient manner also in cases where substantially no excess heat is available in the propulsion system 7, 8, 9. As a further result thereof, the need for starting the propulsion system 7, 8, 9, or components 7, 8, 9 thereof, for increasing the available heat in the propulsion system 7, 8, 9, is circumvented. Accordingly, the thermal management system 1 provides conditions for a more efficient utilization of energy in a propulsion system 7, 8, 9 of a vehicle. The control arrangement 50 may be configured to operate the system 1 in the first heat pump operation mode when the temperature level in the propulsion system 7, 8, 9 is below a threshold level, and/or when the temperature level in the propulsion system 7, 8, 9 is predicted to become below a threshold level.

Furthermore, according to some embodiments, the control arrangement 50 may be configured to, in a second heat pump operation mode, control the fourth valve 43 to regulate flow of coolant through the battery coolant branch 41' and activate the battery coolant pump 46 so as to transfer heat collected from the surroundings 37 by the battery radiator 51 to the first evaporator 21. Moreover, in the second heat pump operation mode, the control arrangement 50 may be configured to control the first valve 25 to the second state, control the second valve 29 to the first state, activate the compressor 24, the heating circuit pump 34, and/or the fan 33. In this manner, a thermal management system 1 is provided in which heat from the surroundings 37, collected by the battery radiator 51, can be utilized for heating the occupant compartment 5. Moreover, in the second heat pump operation mode, heat from the surroundings 37 can be utilized for heating the occupant compartment 5 in a manner less dependent on the temperature of other components 7, 8 of the propulsion system 7, 8, 9. The control arrangement 50 may be configured to operate the system 1 in the second heat pump operation mode when the temperature level in the propulsion system 7, 8, 9 is below a threshold level, and/or when the temperature level in the propulsion system 7, 8, 9 is predicted to become below a threshold level.

Figure 2:
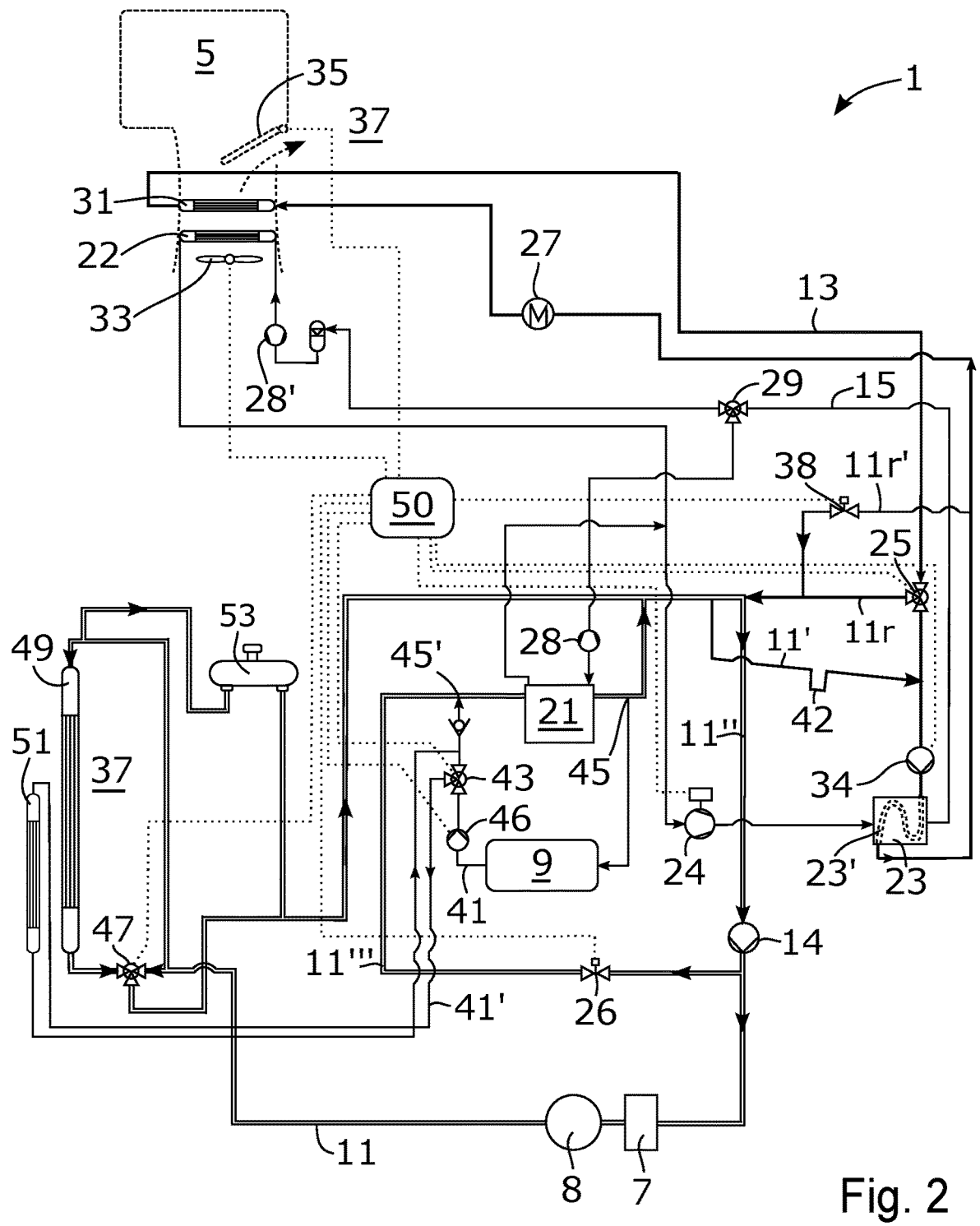

FIG. 2 schematically illustrates a thermal management system 1, according to some further embodiments. The thermal management system 1 according to the embodiments illustrated in FIG. 2 comprises the same features, functions, and advantages as the thermal management system 1 described with reference to FIG. 1, with some differences, explained below.

According to the embodiments illustrated in FIG. 2, the first valve 25 comprises two outlets and one inlet, wherein the inlet is connected to the heat exchanger 31 of the heating circuit 13, a first outlet is connected to the heating circuit pump 34 of the heating circuit 13 and a second outlet is connected to the first return conduit 11r. The first return conduit 11r is configured to return coolant to the propulsion coolant circuit 11 from the heating circuit 13 at a position downstream of the condenser 23. An inlet of the first return conduit 11r is thus positioned downstream of the condenser 23 such that coolant is flowing from the heating circuit 13 at a position downstream of the condenser 23 into the first return conduit 11r.

The first return conduit 11r extends between the first valve 25 and a portion 11'' of the propulsion coolant circuit 11 upstream of the first coolant pump 14 of the propulsion coolant circuit 11. Moreover, according to the embodiments illustrated in FIG. 2, the connecting conduit 11' is connected to the heating circuit 13 at a position between the first outlet of the first valve 25 and the heating circuit pump 34. Furthermore, the connecting conduit 11' comprises a flow restrictor 42 in the form of an anti-mixing loop. According to further embodiments, the connecting conduit 11' may comprise another type of flow restrictor 42, such as a one way valve, or the like. The connecting conduit 11' is connecting the propulsion coolant circuit 11 to the heating circuit 13 at a position upstream of the condenser 23. An outlet of the connecting conduit 11' is thus positioned upstream of the condenser 23 such that coolant flowing through the connecting conduit 11' flows into the heating circuit 13 at a position upstream of the condenser 23.

The first valve 25 is configured to control flow of coolant through the connecting conduit 11', i.e. is controllable to hinder or allow flow of coolant through the connecting conduit 11'. In more detail, the first valve 25 is controllable between a first state and a second state. In the first state, the first valve 25 closes the first outlet connected to heating circuit pump 34 and opens the second outlet connected to the return conduit 11r. In this manner, coolant is allowed to flow through the connecting conduit 11' to the heating circuit pump 34 when the first valve 25 is in the first state and the heating circuit pump 34 is pumping coolant. In the second state, the first valve 25 closes the second outlet connected to the first return conduit 11r and opens the first outlet connected to heating circuit pump 34. In this manner, coolant flows from the first outlet of the first valve 25 to the heating circuit pump 34 when the first valve 25 is in the second state and the heating circuit pump 34 is pumping coolant. As a further result, coolant is hindered from flowing through the connecting conduit 11' when the valve is in the second state. This because the first valve 25 closes the second outlet connected to the first return conduit 11r when in the second state. Thereby, no flow of coolant is obtained through the connecting conduit 11' and coolant of the propulsion coolant circuit 11 will instead flow through the portion 11" of the propulsion coolant circuit 11 connected to the first coolant pump 14 when the first valve 25 is in the second state. The portion 11" of the propulsion coolant circuit 11 connected to the first coolant pump 14 may also be referred to as a bypass line 11" since it bypasses the connecting conduit 11'.

An advantage with the solution according to the embodiments illustrated in FIG. 2 is that the heating circuit pump 34 can pump coolant with a low pressure drop through the connecting conduit 11' because of the valve-less connection between the heating circuit pump 34 and the expansion tank 53 of the propulsion coolant circuit 11. Thereby the pump inlet pressure at the heating circuit pump 34 is kept high giving increased margin for e.g. pump cavitation in the heating circuit pump 34.

As indicated above, according to the embodiments illustrated in FIG. 2, the first valve 25 is arranged downstream of the heat exchanger 31 of the heating circuit 13. Accordingly, the first return conduit 11r is configured to return coolant to the propulsion coolant circuit 11 from the heating circuit 13 at a position downstream of the heat exchanger 31. Consequently, coolant returned from the heating circuit 13 via the first return conduit 11r has passed the heat exchanger 31 of the heating circuit 13. However, according to the embodiments illustrated in FIG. 2, the propulsion coolant circuit 11 further comprises a second return conduit 11r. The second return conduit 11r' is configured to return coolant to the propulsion coolant circuit 11 from the heating circuit 13 at a position upstream of the heat exchanger 31. An inlet of the second return conduit 11r' is thus positioned upstream of the heat exchanger 31. The system 1 further comprises a valve 38 configured to control flow of coolant through the second return conduit 11r. In more detail, the valve 38 is controllable between a closed state in which the valve 38 hinders flow of coolant through the second return conduit 11r' and an open state, in which the in which the valve 38 allows flow of coolant through the second return conduit 11r. Thus, by controlling the valve 38 to the open state, coolant can be returned to the propulsion coolant circuit 11 from the heating circuit 13 at a position upstream of the heat exchanger 31. The valve 38 can thus be utilized to increase the flow rate of coolant through the condenser 23 when there is a low heating need of the occupant compartment 5, such as during summertime. That is, by controlling the valve 38 to the open state, a lower pressure drop is provided which can increase the flow rate of coolant through the condenser 23.

As seen in FIG. 2, an inlet of the connecting conduit 11' is arranged upstream of outlets of the respective first and second return conduits 11r, 11r' at the propulsion coolant circuit 11. In this manner, it can be ensured that coolant having a low temperature is flowing from the propulsion coolant circuit 11 to the heating circuit 13 via the first connecting conduit 11'.

Figure 3:
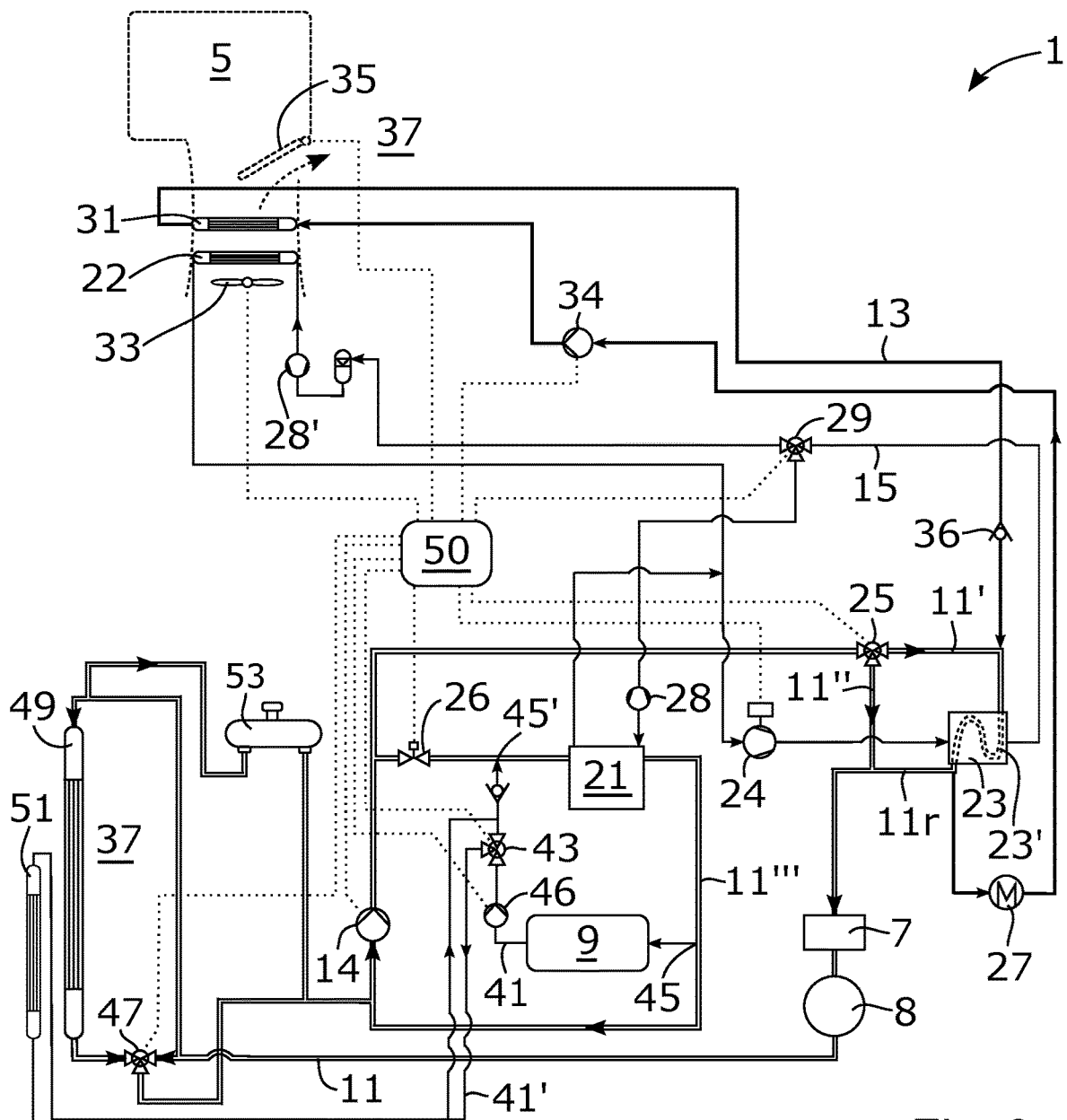

FIG. 3 schematically illustrates a thermal management system 1, according to some further embodiments. The thermal management system 1 according to the embodiments illustrated in FIG. 3 may comprise the same features, functions, and advantages as the thermal management system 1 described with reference to FIG. 1 or FIG. 2, with some exceptions, explained below.

According to the embodiments illustrated in FIG. 3, the propulsion coolant circuit 11 comprises a bypass line 11" bypassing the connecting conduit 11'. The bypass line 11" forms a continuation of the propulsion coolant circuit 11. According to the embodiments illustrated in FIG. 1, the first valve 25 is controllable between a first state, in which the first valve 25 directs coolant through the connecting conduit 11', and a second state, in which the first valve 25 directs coolant through the bypass line 11". In more detail, according to the embodiments illustrated in FIG. 3, the first valve 25 comprises one inlet and a first and a second outlet. The inlet is connected to the first coolant pump 14 of the propulsion coolant circuit 11, the first outlet is connected to the connecting conduit 11' and the second outlet is connected to the bypass line 11'. In the first state the first valve 25 opens the first outlet and closes the second outlet. In the second state the first valve 25 opens the second outlet and closes the first outlet.

Moreover, according to the embodiments illustrated in FIG. 3, the heating circuit pump 34 of the heating circuit 13 is not positioned between the connecting conduit 11' and the first return conduit 11r. Instead, the heating circuit pump 34 of the heating circuit 13 is position downstream of the first return conduit 11r and upstream of the connecting conduit 11'. Therefore, according to the embodiments illustrated in FIG. 3, the first coolant pump 14 of the propulsion coolant circuit 11 will pump coolant through the connecting conduit 11', the condenser 23 and the first return conduit 11r when the first valve 25 is in the first state. Moreover, the heating circuit pump 34 of the heating circuit 13 is configured to pump coolant of the heating circuit 13 through the condenser 23. Therefore, according to these embodiments, a higher flow rate of coolant through the condenser 23 can be obtained.

According to the embodiments illustrated in FIG. 3, the system 1 comprises only one return conduit 11r. Therefore, according to these embodiments, the first return conduit 11r may simply be referred to as "the return conduit 11r". However, in the following, the wording "the first return conduit 11r" is used.

Since the heating circuit pump 34 of the heating circuit 13 is positioned outside of the circuit formed by the connecting conduit 11', the coolant channels 23' of the condenser 23, and the first return conduit 11r, the connecting conduit 11', the coolant channels 23' of the condenser 23 and the first return conduit 11r may according to these embodiments be referred to as a coolant branch 11', 23', 11r of the propulsion coolant circuit 11. Such a coolant branch 11', 23', 11r and the heating circuit 13 shares the same coolant channels 23' in the condenser 23. Thereby, a simple and efficient system 1 is provided requiring less complex and costly components. As understood from the above, coolant of the propulsion coolant circuit 11 and coolant of the heating circuit 13 will be at least partially mixed when the first valve 25 is in the first state.

As can be seen in FIG. 3, the heating circuit 13 comprises a one way valve 36 arranged between the first valve 25 and the heat exchanger 31 of the heating circuit 13. The one way valve 36 is arranged to hinder flow of coolant from the first valve 25 towards the heat exchanger 31 of the heating circuit 13 when the first valve 25 is in the first state.

The control arrangement 50 as described herein may be configured to control the components 14, 24, 25, 26, 29, 33, 34, 35, 38, 43, 46, 47 of the system 1, and to operate the system 1 in the different operation modes, based on temperature levels of components 7, 8, 9 of the propulsion system 7, 8, 9, heating/cooling demands of the components 7, 8, 9 of the propulsion system 7, 8, 9, and/or a heating/cooling demand of the occupant compartment 5.

One skilled in the art will appreciate that the operation modes of the system 1 may be implemented by programmed instructions. These programmed instructions are typically constituted by a computer program, which, when it is executed in the control arrangement 50, ensures that the control arrangement 50 carries out the desired control, such as the operation modes of the system 1 described herein. The computer program is usually part of a computer program product which comprises a suitable digital storage medium on which the computer program is stored.

The control arrangement 50 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 50 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 50 is connected to components of the system 1 for receiving and/or sending input and output signals. These input and output signals may comprise waveforms, pulses, or other attributes which the input signal receiving devices can detect as information and which can be converted to signals processable by the control arrangement 50. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections to the respective components of the system 1 for receiving and sending input and output signals may take the form of one or more from among a cable, a data bus, e.g. a CAN (controller area network) bus, a MOST (media orientated systems transport) bus or some other bus configuration, or a wireless connection.

In the embodiments illustrated, the system 1 comprises a control arrangement 50 but might alternatively be implemented wholly or partly in two or more control arrangements or two or more control units.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles of the type here concerned are therefore often provided with significantly more control arrangements than depicted in FIG. 1-FIG. 3, as one skilled in the art will surely appreciate.

The computer program product may be provided for instance in the form of a data carrier carrying computer program code for performing at least some of the operation modes of the system 1 according to some embodiments when being loaded into one or more calculation units of the control arrangement 50. The data carrier may be, e.g. a CD ROM disc, or a ROM (read-only memory), a PROM (programmable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control arrangement 50 remotely, e.g., over an Internet or an intranet connection, or via other wired or wireless communication systems.

Figure 4:
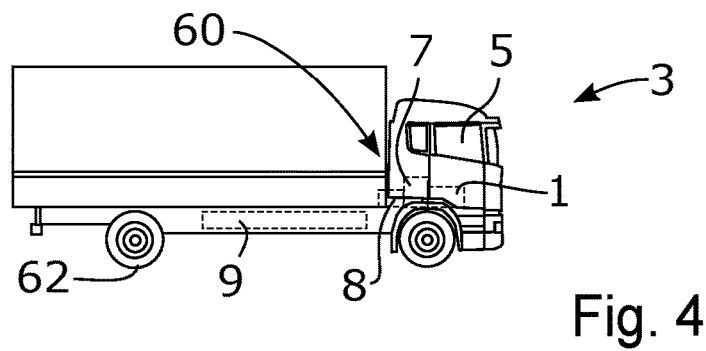
FIG. 4 illustrates a vehicle according to some embodiments.

FIG. 4 illustrates a vehicle 3 according to some embodiments. The vehicle 3 comprises an occupant compartment 5 configured to accommodate one or more occupants. Moreover, the vehicle 3 comprises a powertrain 60 comprising a propulsion system 7, 8, 9 configured to provide motive power to the vehicle 3, via wheels 62 of the vehicle 3. Furthermore, the powertrain 60 may comprise a thermal management system 1 according to any one of the embodiments illustrated in FIG. 1-FIG. 3. Moreover, the propulsion system 7, 8, 9 may be a propulsion system 7, 8, 9 according to any one of the embodiments illustrated in FIG. 1-FIG. 3, i.e. an electric propulsion system 7, 8, 9. As an alternative, or in addition, the propulsion system of the powertrain 60 may comprise an internal combustion engine such as for example a compression ignition engine, such as a diesel engine, or an Otto engine with a spark-ignition device, wherein the Otto engine may be configured to run on gas, petrol, alcohol, similar fuels, or combinations thereof.

According to the illustrated embodiments, the vehicle 3 is a truck. However, according to further embodiments, the vehicle 3, as referred to herein, may be another type of manned or unmanned vehicle for land or water based propulsion such as a lorry, a bus, a construction vehicle, a tractor, a car, a ship, a boat, or the like.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The battery 9, as referred to herein, may comprise a set of batteries each comprising a number of battery cells. The electric machine 8, as referred to herein, may comprise one or more electrical motors. The wording "surroundings 37", as used herein, is intended to encompass surrounding air, such as surrounding air outside of the vehicle 3, and/or air surrounding one or more radiators 49, 51 of the vehicle 3. The different states of the valves, as described herein, may encompass different opening/closing states, opening/closing positions, opening/closing degrees, or the like. The compressor 24, as referred to herein, may also be referred to as a working media pump 24.

According to the embodiments illustrated in FIG. 1-FIG. 3, each of the first valve 25 and the second valve 29 comprises a three-way valve. However, according to further embodiments, one of, or both of, the first valve 25 and the second valve 29 may comprise one or more other types of valves. Such one or more other types of valves may be positioned at other positions in the respective circuit 11, 15 than depicted in FIG. 1-FIG. 3. Furthermore, as understood from the herein described, the wording "directs coolant" or "control flow of coolant", as used herein may be an indirect direction of coolant or an indirect control flow of coolant. As an example, according to some embodiments, the first valve 25 is configured to cause coolant to flow through the connecting conduit 11' when in the first state and is configured hinder/block flow of coolant through the connecting conduit 11' when in the second state. Moreover, according to some embodiments, the first valve 25 is configured to cause coolant to flow through the bypass line 11" when the first valve 25 is in the second state. Therefore, throughout this disclosure, the wording "directs coolant" or "control flow of coolant" may be replaced by the wording "cause coolant to flow".

As used herein, the term "comprising" or "comprises" is open-ended, and includes one or more stated features, elements, steps, components, or functions but does not preclude the presence or addition of one or more other features, elements, steps, components, functions or groups thereof.

The invention claimed is:

1. A thermal management system for a vehicle, wherein the vehicle comprises an occupant compartment and a propulsion system configured to provide motive power to the vehicle, and wherein the thermal management system comprises:
   a propulsion coolant circuit configured to cool at least a portion of the propulsion system;
   a heating circuit configured to heat the occupant compartment;
   a heat pump circuit comprising a first evaporator in the propulsion coolant circuit and a condenser in the heating circuit, wherein the propulsion coolant circuit comprises a connecting conduit connecting the propulsion coolant circuit to the heating circuit at a position upstream of the condenser, and a first return conduit configured to return coolant to the propulsion coolant circuit from the heating circuit at a position downstream of the condenser; and
   a first valve configured to control flow of coolant through the connecting conduit, wherein the propulsion system is an electric propulsion system comprising a battery, and wherein the first evaporator is further configured to cool the battery, wherein the propulsion coolant circuit comprises a coolant branch and a second valve configured to regulate the flow of coolant through the coolant branch, and wherein the first evaporator is arranged in the coolant branch of the propulsion coolant circuit.

2. The thermal management system according to claim 1, wherein the propulsion coolant circuit comprises a bypass line bypassing the connecting conduit, and wherein the first valve is controllable between a first state in which the first valve directs coolant through the connecting conduit and a second state in which the first valve directs coolant through the bypass line.

3. The thermal management system according to claim 1, wherein the propulsion system is an electric propulsion system comprising power electronics and an electric machine, and wherein the propulsion coolant circuit is configured to cool at least one of the power electronics and the electric machine.

4. The thermal management system according to claim 1, wherein the heat pump circuit comprises a second evaporator configured to cool the occupant compartment and a third valve controllable between a first state in which the third valve causes working media in the heat pump circuit to flow through the first evaporator, and a second state in which the third valve causes working media in the heat pump circuit to flow through the second evaporator.

5. The thermal management system according to claim 4 further comprising a control arrangement configured to, in an occupant compartment cooling mode, control the first valve to allow flow of coolant through the connecting conduit and control the third valve to the second state.

6. The thermal management system according to claim 5, wherein the control arrangement is configured to, in an occupant compartment heating mode, control the first valve to hinder flow of coolant through the connecting conduit and control the third valve to the first state.

7. The thermal management system according to claim 1, wherein the propulsion coolant circuit comprises a first radiator and a first coolant pump, and wherein the thermal management system comprises a control arrangement configured to, in a first heat pump operation mode, control the first valve to hinder flow of coolant through the connecting conduit and activate the first coolant pump so as to transfer heat collected from the surroundings by the first radiator to the first evaporator.

8. The thermal management system according to claim 1 further comprising a battery coolant circuit configured to cool the battery, and wherein the battery coolant circuit comprises an inlet in the coolant branch downstream of the first evaporator and an outlet in the coolant branch upstream of the first evaporator.

9. The thermal management system according to claim 8, wherein the battery coolant circuit comprises a battery coolant branch, a battery radiator in the battery coolant branch, and a fourth valve configured to regulate the flow of coolant through the battery coolant branch.

10. The thermal management system according to claim 9, wherein the battery coolant circuit comprises a battery coolant pump, and wherein the thermal management system comprises a control arrangement configured to, in a second heat pump operation mode, control the fourth valve to regulate flow of coolant through the battery coolant branch and activate the battery coolant pump so as to transfer heat collected from the surroundings by the battery radiator to the first evaporator.

11. The thermal management system according to claim 1, wherein the heating circuit comprises a heat exchanger configured to heat the occupant compartment, and wherein the first return conduit is configured to return coolant to the propulsion coolant circuit from the heating circuit at a position upstream of the heat exchanger.

12. The thermal management system according to claim 11, wherein the propulsion coolant circuit comprises a second return conduit configured to return coolant to the propulsion coolant circuit from the heating circuit at a position downstream of the heat exchanger.

13. The thermal management system according to claim 12 further comprising a flow control arrangement controllable between a first state in which the flow control arrangement directs coolant through the first return conduit and a second state in which the flow control arrangement directs coolant through the second return conduit.

14. The thermal management system according to claim 1, wherein the heating circuit comprises a heat exchanger and a fan configured to generate an airflow through the heat exchanger towards the occupant compartment, and wherein the thermal management system comprises a valve arrangement controllable to a state in which the valve arrangement directs at least part of the airflow to the surroundings.

15. A powertrain for a vehicle comprising an occupant compartment, wherein the powertrain comprises:
 a propulsion system configured to provide motive power to the vehicle; and
 a thermal management system comprising:
  a propulsion coolant circuit configured to cool at least a portion of the propulsion system;
  a heating circuit configured to heat the occupant compartment; and
  a heat pump circuit comprising a first evaporator in the propulsion coolant circuit and a condenser in the heating circuit, wherein the propulsion coolant circuit comprises a connecting conduit connecting the propulsion coolant circuit to the heating circuit at a position upstream of the condenser, and a first return conduit configured to return coolant to the propulsion coolant circuit from the heating circuit at a position downstream of the condenser; and
  a first valve configured to control flow of coolant through the connecting conduit, wherein the propulsion system is an electric propulsion system comprising a battery, and wherein the first evaporator is further configured to cool the battery, wherein the propulsion coolant circuit comprises a coolant branch and a second valve configured to regulate the flow of coolant through the coolant branch, and wherein the first evaporator is arranged in the coolant branch of the propulsion coolant circuit.

16. A vehicle comprising:
 an occupant compartment;
 a powertrain comprising a propulsion system configured to provide motive power to the vehicle; and
 a thermal management system comprising:
  a propulsion coolant circuit configured to cool at least a portion of the propulsion system;
  a heating circuit configured to heat the occupant compartment; and
  a heat pump circuit comprising a first evaporator in the propulsion coolant circuit and a condenser in the heating circuit, wherein the propulsion coolant circuit comprises a connecting conduit connecting the propulsion coolant circuit to the heating circuit at a position upstream of the condenser, and a first return conduit configured to return coolant to the propulsion coolant circuit from the heating circuit at a position downstream of the condenser, and
  a first valve configured to control flow of coolant through the connecting conduit, wherein the propulsion system is an electric propulsion system comprising a battery, and wherein the first evaporator is further configured to cool the battery, wherein the propulsion coolant circuit comprises a coolant branch and a second valve configured to regulate the flow of coolant through the coolant branch, and wherein the first evaporator is arranged in the coolant branch of the propulsion coolant circuit.

17. A thermal management system for a vehicle, wherein the vehicle comprises an occupant compartment and a propulsion system configured to provide motive power to the vehicle, and wherein the thermal management system comprises:
 a propulsion coolant circuit configured to cool at least a portion of the propulsion system;
 a heating circuit configured to heat the occupant compartment;
 a heat pump circuit comprising a first evaporator in the propulsion coolant circuit and a condenser in the heating circuit, wherein the propulsion coolant circuit comprises a connecting conduit connecting the propulsion coolant circuit to the heating circuit at a position upstream of the condenser, and a first return conduit configured to return coolant to the propulsion coolant circuit from the heating circuit at a position downstream of the condenser, and
 a first valve configured to control flow of coolant through the connecting conduit, wherein the propulsion system is an electric propulsion system comprising a battery, and wherein the first evaporator is further configured to cool the battery, wherein the propulsion coolant circuit comprises a coolant branch and a second valve configured to regulate the flow of coolant through the coolant branch, and wherein the first evaporator is arranged in the coolant branch; and
 a battery coolant circuit configured to cool the battery, and wherein the battery coolant circuit comprises an inlet in the coolant branch downstream of the first evaporator and an outlet in the coolant branch upstream of the first evaporator.

18. A thermal management system for a vehicle, wherein the vehicle comprises an occupant compartment and a propulsion system configured to provide motive power to the vehicle, and wherein the thermal management system comprises:
 a propulsion coolant circuit configured to cool at least a portion of the propulsion system;
 a heating circuit configured to heat the occupant compartment;
 a heat pump circuit comprising a first evaporator in the propulsion coolant circuit and a condenser in the heating circuit, wherein the propulsion coolant circuit comprises a connecting conduit connecting the propulsion coolant circuit to the heating circuit at a position upstream of the condenser, and a first return conduit configured to return coolant to the propulsion coolant circuit from the heating circuit at a position downstream of the condenser; and a first valve configured to control flow of coolant through the connecting conduit, wherein the propulsion system is an electric propulsion system comprising a battery, wherein the first evaporator is further configured to cool the battery, and wherein the heating circuit comprises:
  a heat exchanger configured to heat the occupant compartment, and wherein the first return conduit is configured to return coolant to the propulsion coolant circuit from the heating circuit at a position upstream of the heat exchanger, and
  a second return conduit configured to return coolant to the propulsion coolant circuit from the heating circuit at a position downstream of the heat exchanger.

* * * * *